United States Patent Office 3,117,685
Patented Jan. 14, 1964

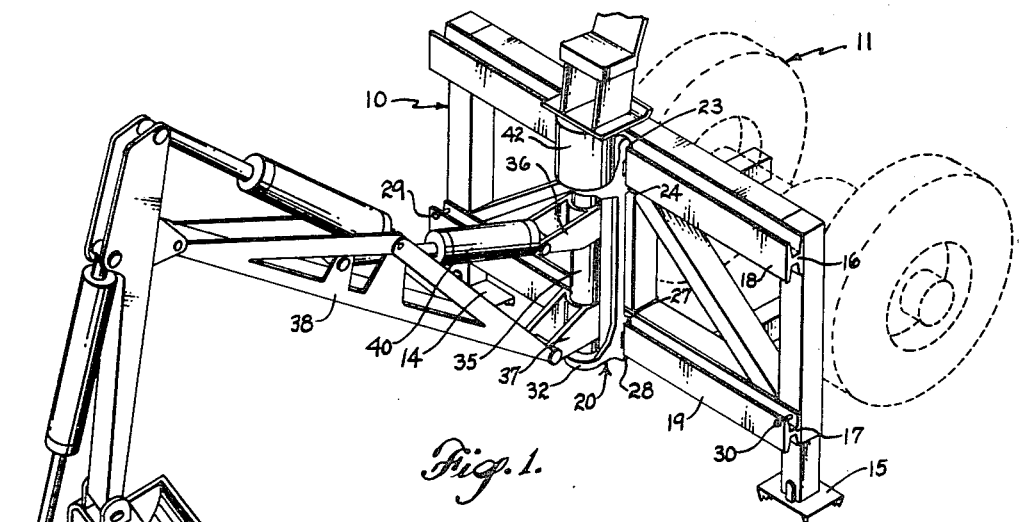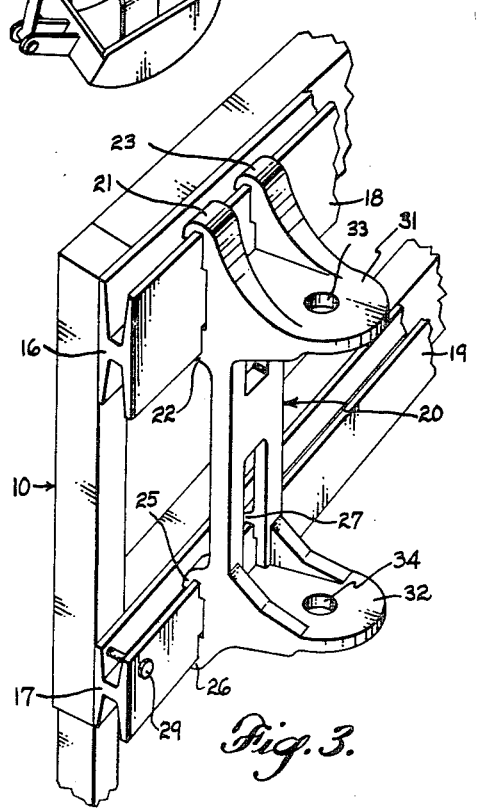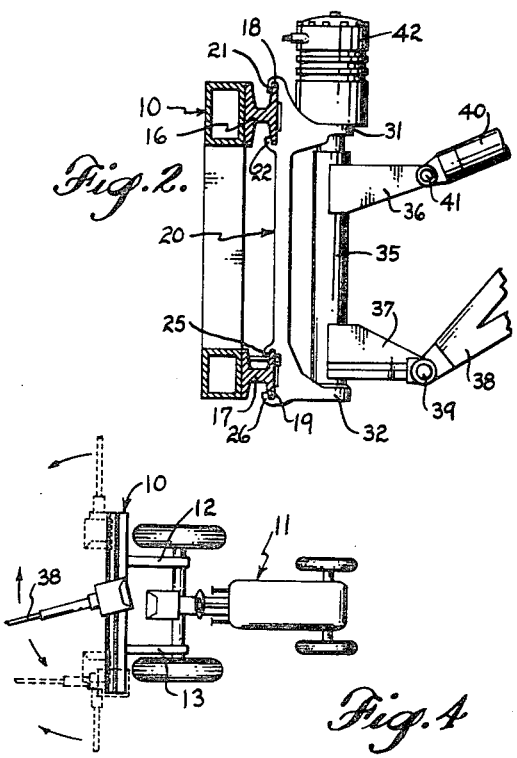

3,117,685
TRANSVERSELY SHIFTABLE BOOM MOUNTING FOR MECHANICAL SHOVELS
Charles J. Davis, Wichita, Kans., assignor to Massey-Ferguson, Inc., a corporation of Maryland
Filed Dec. 6, 1957, Ser. No. 701,059
1 Claim. (Cl. 214—138)

This invention relates generally to earth digging and earth moving equipment and more particularly to the type known as mechanical shovels, or in the trade as "back hoes." Still more particularly this invention relates to a type of mechanical shovel and a mounting therefor which may be attached to and operated from the rear of a vehicle, such as a farm tractor or a truck.

Mechanical shovels of the last mentioned type ordinarily involve a rigid elongated upright frame which may be attached to a vehicle in a position transverse to the longitudinal center line thereof, and which carries a boom for supporting a shovel, the inner end of the boom being mounted on an upright post or mast. The mounting for the swivel post and its boom is ordinarily a fixed structure positioned midway between the opposite ends of the transversely extending rigid frame. With the boom in such a centrally mounted position on the frame it is impossible for the boom and its shovel to be operated in such a manner as to dig a narrow trench alongside a building, a foundation, or a fence because the transversely extending frame prevents the boom from being moved to a position immediately alongside and parallel to the building or fence.

It is an important object of this invention, therefore, to provide a mechanical shovel construction which permits the boom and its swivel post mounting to be moved to various selected positions along the transversely disposed shovel frame, thus permitting the boom to be moved to either extreme end of the frame, if desired, so that the shovel can be operated to dig a trench immediately alongside the foundation of a building, for instance.

It is an additional object of the invention to provide a construction of the type mentioned which will permit relocation of the boom and its swivel post or mast without disconnecting the mast from its supporting transverse frame.

It is the additional object of the invention to provide a shiftable boom mount structure which can be adapted to most conventional mechanical shovel designs, regardless of the type of mechanism employed to actuate the shovel at the outer end of the boom.

The invention, together with other object attending its production, will be more clearly understood when the following description is read in connection with the accompanying drawing, in which:

FIG. 1 is a perspective view of a mechanical shovel embodying my invention, attached to the rear end of a tractor, the tractor being illustrated partially in broken lines;

FIG. 2 is a fragmentary side view showing the details in the construction of the various mounting members, the frame of the shovel being shown in vertical section;

FIG. 3 is a fragmentary perspective view of one end of the mechanical shovel frame with the boom mounting bracket mounted thereon, the boom swivel post being omitted; and FIG. 4 is a top plan view of a tractor with a mechanical shovel mounted at the rear thereof and embodying my invention, the broken lines indicating various positions to which the boom and its swivel post can be moved with respect to the frame of the shovel.

Referring now to the drawings, the shovel illustrated includes a frame 10 which is disposed transversely with respect to the longitudinal center line of a tractor 11, the frame being attached rigidly to the tractor by suitable brace members 12 and 13 (FIG. 4).

The frame includes vertically adjustable feet 14 and 15 (FIG. 1), one at each end thereof. It also includes means defining transversely disposed vertical mounting surfaces. In the present instance this means comprises two rigidly attached horizontal H-section boom supporting members 16 and 17. These transverse beams are mounted in vertically spaced parallel relationship on the frame 10, and are preferably welded thereto.

The respective outer flanges 18 and 19 of the two beams 16 and 17 constitute slideways for the respective upper and lower ends of a heavy unitary boom mounting bracket, designated as a whole by the number 20.

Near its upper end bracket 20 is provided with mounting surfaces for cooperation with the corresponding surfaces of the frame. In the illustrative device these mounting surfaces are defined by two transversely spaced pairs of rigid integral fingers. The fingers are designated individually by the numerals 21, 22 and 23, 24. The fingers in each pair are vertically spaced from each other and cooperate to loosely and slidably embrace the respective upper and lower edges of the outer flange 18 of the transverse beam 16. Similarly the lower end of bracket 20 carries two transversely spaced pairs of rigid integral fingers designated individually by the numerals 25, 26 and 27, 28. The fingers 25 and 27 are spaced vertically from their cooperating respective fingers 26 and 28. The lower set of fingers also serve to loosely grip and slide along the outer flange 19 of the transverse beam member 17. It will thus be seen that the bracket 20 may be moved bodily along the respective flanges 18 and 19 of the transverse boom supporting beams. Removable stop pins 29 and 30 (FIG. 1) are passed through aligned holes in the flanges of transverse beam 17 and serve to limit movement of bracket 20 at the respective outer ends of its permitted path of travel.

Boom supporting bracket 20 is also provided with integral rigid vertically spaced horizontal plates 31 and 32 (FIG. 3) which are respectively provided with suitable vertically aligned bearing seats 33 and 34 which serve to journal the respective upper and lower ends of a swivel post or mast 35. Swivel post 35 rigidly carries brackets 36 and 37. The inner end of a boom 38 is pivotally mounted at 39 on bracket 37. Similarly, the inner end of a boom actuating cylinder 40 is pivotally supported at 41 on the outer end of bracket 36.

The mast assembly also includes a hydraulically powered rotary actuator 42 which is mounted on the upper plate 31 of bracket 20, and which serves to oscillate the swivel post or mast 35 about its vertical axis to swing the boom 38 in an arc about that axis. The construction of the actuator 42 itself comprises no part of the present invention.

From the above description it will be seen that when frame 10 is attached to vehicle 11 and the feet of the frame are resting on the ground or other supporting surface, the boom supporting bracket 20 and its attached boom may be manually moved along the slideways 18 and 19 in order to position the boom in any desired position with relation to the longitudinal centerline of the vehicle. The movement is limited only by the length of the slideways 18 and 19 and by the stops 29 and 30 at the outer ends of one of those slideways. It will also be apparent that the bracket 20 can be adjusted along the slideways 18, 19 using hydraulic force by swinging the boom to one side and hydraulically extending or retracting the shovel with the shovel being anchored in any convenient manner. That is, when it is desired to shift the bracket 20 laterally along the slideways 18, 19, the boom 38 is swung to a position approximately parallel to the frame 10—for example, to the dashed lines of FIG. 4. The shovel is then lowered into the ground and the operator either jackknifes the boom so as to slide the bracket along the slideways toward the shovel or extends the boom so as to slide the bracket away from the shovel.

Alternatively, the boom can be extended rearwardly of the frame 10 and the shovel driven into the ground to provide an anchor point. The boom swinging or turning actuator 42 can then be operated to exert a force tending to slide the brackets 20 along the ways 18, 19 in the desired direction. In these ways the hydraulic motors of the back hoe may be used to laterally position the implement along the frame 10.

FIG. 4 clearly illustrates several of the positions to which the boom may be moved with respect to the supporting frame 10.

Having described the invention with sufficient clarity to enable those familiar with this art to construct and use it, I claim:

An earth-working vehicle comprising, in combination, a pair of ground engaging wheels at one end of said vehicle, a transverse frame mounted outboard of said wheels, said frame having spaced vertical surfaces running transversely one above the other, from the outward side of one of said wheels to the outward side of the other of said wheels, a bracket having spaced flat mounting surfaces, said frame and said bracket carrying means holding said bracket mounting surfaces in flat abutting engagement with said frame vertical surfaces so as to solidly mount the bracket on the vehicle, a shovel-supporting assembly including a boom pivoted on said bracket for horizontal swinging movement, a shovel pivotally carried on said boom, a hydraulic motor on said bracket for horizontally swinging said boom, said boom also being pivoted relative to said bracket for vertical swinging movement, a hydraulic motor anchored to said assembly for vertically swinging said boom, said assembly including hydraulic motors for moving said shovel toward and away from said bracket, and said holding means permitting adjustment of said bracket along said transversely running frame surfaces under the power of an appropriate one of said hydraulic motors.

References Cited in the file of this patent

UNITED STATES PATENTS

| | | |
|---|---|---|
| 486,283 | George | Nov. 15, 1892 |
| 2,358,543 | Tofflemire | Sept. 19, 1944 |
| 2,558,306 | McIntyre | June 26, 1951 |
| 2,785,813 | Tofflemire | Mar. 19, 1957 |
| 2,828,880 | Perry | Apr. 1, 1958 |
| 2,836,449 | Varlonga | May 27, 1958 |

FOREIGN PATENTS

| | | |
|---|---|---|
| 440,488 | Germany | Feb. 8, 1927 |
| 1,014,229 | France | May 28, 1952 |